(12) United States Patent
Acharya et al.

(10) Patent No.: US 6,738,520 B1
(45) Date of Patent: May 18, 2004

(54) METHOD OF COMPRESSING AN IMAGE

(75) Inventors: Tinku Acharya, Chandler, AZ (US);
Bhargab Bikram Bhattacharya, Calcutta (IN); Malay Kumar Kundu, Calcutta (IN); Suman Kumar Mitra, Howrah (IN); Chivukula A. Murthy, Calcutta (IN)

(73) Assignee: Intel Corporation, Santa Clara, CA (US)

( * ) Notice: Subject to any disclaimer, the term of this patent is extended or adjusted under 35 U.S.C. 154(b) by 513 days.

(21) Appl. No.: 09/597,354

(22) Filed: Jun. 19, 2000

(51) Int. Cl.[7] .................................. G06K 9/36
(52) U.S. Cl. ..................................... 382/232
(58) Field of Search ................ 382/232, 233, 382/240, 248, 249, 253; 348/414.1, 417.1, 418.1, 422.1; 375/240.01, 240.04, 240.1, 240.16; 358/426.04

(56) References Cited

U.S. PATENT DOCUMENTS

| | | | |
|---|---|---|---|
| 4,941,193 A | * 7/1990 | Barnsley et al. ............ 382/232 |
| 5,065,447 A | * 11/1991 | Barnsley et al. ............ 382/232 |
| 5,347,600 A | * 9/1994 | Barnsley et al. ............ 382/232 |
| 5,416,856 A | * 5/1995 | Jacobs et al. ............... 382/232 |
| 5,592,228 A | 1/1997 | Dachiku et al. |
| 5,600,731 A | 2/1997 | Sezan et al. |
| 5,724,451 A | * 3/1998 | Shin et al. .................. 382/240 |
| 5,740,282 A | * 4/1998 | Hurd ......................... 382/248 |
| 5,778,098 A | 7/1998 | Lee et al. |
| 5,832,115 A | 11/1998 | Rosenberg |
| 5,862,262 A | * 1/1999 | Jacobs et al. ............... 382/249 |
| 5,867,221 A | * 2/1999 | Pullen et al. ............. 348/417.1 |
| 5,875,122 A | 2/1999 | Acharya |
| 5,978,030 A | 11/1999 | Jung et al. |
| 5,982,441 A | * 11/1999 | Hurd et al. ................. 348/417 |
| 5,995,210 A | 11/1999 | Acharya |
| 6,009,201 A | 12/1999 | Acharya |
| 6,009,206 A | 12/1999 | Acharya |
| 6,009,210 A | 12/1999 | Kang |
| 6,044,168 A | 3/2000 | Tuceryan et al. |
| 6,047,303 A | 4/2000 | Acharya |
| 6,091,851 A | 7/2000 | Acharya |
| 6,094,508 A | 7/2000 | Acharya et al. |
| 6,108,453 A | 8/2000 | Acharya |
| 6,124,811 A | 9/2000 | Acharya et al. |
| 6,130,960 A | 10/2000 | Acharya |
| 6,151,069 A | 11/2000 | Dunton et al. |
| 6,151,415 A | 11/2000 | Acharya et al. |
| 6,154,493 A | 11/2000 | Acharya et al. |
| 6,157,747 A | 12/2000 | Szeliski et al. |

(List continued on next page.)

OTHER PUBLICATIONS

"Local Motion Tracking in Semantic–Based Coding of Videophone Sequences", IEEE, 1997, P.M. Antoszczyszyn, et al., 3 pages.

"Image Sequence Coding at Very Low Bitrates: A Review", H. Li, et al., 1994 IEEE, 11 pages.

Cai, et al., "Several Key Problems in Model–Based Image Sequence Compression by Using Interframe AUs Correlation", IEEE 1994, pp. 409–413.

Haibo Li, et al., "Recursive Estimation of Facial Expression and Movement", Image Coding Group, Department of Electrical Engineering, Linkoping University, Linkoping, Sweden, 1992 IEEE, pp. 593–596.

(List continued on next page.)

*Primary Examiner*—Jose L. Couso
(74) *Attorney, Agent, or Firm*—Sharon Wong

(57) ABSTRACT

Several embodiments in accordance with the invention are disclosed. An embodiment for compressing a gray scale image is described and an embodiment for decompressing the codebook produced by compressing the gray scale image is described. Of course, the invention is not limited to only gray scale images, however.

22 Claims, 2 Drawing Sheets

U.S. PATENT DOCUMENTS

| | | | |
|---|---|---|---|
| 6,166,664 | A | 12/2000 | Acharya |
| 6,178,269 | B1 | 1/2001 | Acharya |
| 6,195,026 | B1 | 2/2001 | Acharya |
| 6,215,908 | B1 | 4/2001 | Pazmino et al. |
| 6,215,916 | B1 | 4/2001 | Acharya |
| 6,229,578 | B1 | 5/2001 | Acharya et al. |
| 6,233,358 | B1 | 5/2001 | Acharya |
| 6,236,433 | B1 | 5/2001 | Acharya et al. |
| 6,236,765 | B1 | 5/2001 | Acharya |
| 6,269,181 | B1 | 7/2001 | Acharya |
| 6,275,206 | B1 | 8/2001 | Tsai et al. |
| 6,285,796 | B1 | 9/2001 | Acharya et al. |
| 6,292,114 | B1 | 9/2001 | Tsai et al. |
| 6,301,370 | B1 | 10/2001 | Steffens et al. |
| 6,516,093 | B1 | 2/2003 | Pardas et al. |

OTHER PUBLICATIONS

Shih–Ping Liou, "Model Based Motion Estimation Using Constrained Weighted Least Squares", Imaging Department, Siemens Corporation Research, Princeton, NJ, 1994 IEEE, pp. 810–812.

Gozde Bozdagi, et al., "Simultaneous 3–D Motion Estimation and Wire–Frame Model Adaptation Including Photometric Effects Fro Knowledge–Based Video Coding", Electrical and Electronics Eng. Dept. Bilkent University, Ankara, Turkey, 1994 IEEE, pp. 413–416.

Marie Dudon, et al., "Motion Estimation and Triangular Active Mesh", XP 002036860, pp. 47–53.

Marco La Cascia, et al., "Head Tracking Via Robust Registration in Texture Map Images", Computer Science Department, Boston University, Boston, MA, 1998 IEEE, pp. 508–514.

Haibo Li, et al., "3–D Motion Estimation in Model–Based Facial Image Coding", IEEE Transactions on pattern analysis and machine intelligence, vol. 15 No. 6, Jun. 1993, pp. 545–555.

Gozde Bozdagi, et al., "3–D Motion Estimation and Wireframe Adaptation Including Photometric Effects for Model–Based Coding of Facial Image Sequence", IEEE Transactions on circuits and systems for video technology, vol. 4, 1994, pp. 246–256.

D.J. Burr, "Elastic Matching of Line Drawings", IEEE Transactions on pattern anylysis and machine intellegence, vol. PAMI–3, No. 6, Nov. 1981, pp. 708–713.

Chang Choi, et al., "Analysis and Synthesis of Facial Image Sequences in Model–Based Image Coding", IEEE Transactions on circuits and systems or video technology, vol. 4, No. 3, Jun. 1994, pp. 257–275.

John F.S. Yau, et al., "A Texture Mapping Approach to 3–D Facial Image Synthesis", North–Holland Computer Graphics Forum 7 1988, pp. 129–134.

Chung–Lin Haung et al., "Human Facial Feature Extraction For Face Interpretation and Recognition", Pattern Recognition, vol. 25, No. 12, 1992, pp. 1435–1444.

Demetri Terzopoulos, et al., "Constraints on Deformable Models: Recovering 3D Shape and Nonrigid Motion", Schlumberger Palo Research, Palo Alto, CA, Artifical Intelligence 36, 1988, Elsevier Science Publishers B.V., pp. 91–123.

Acharya, "A Memory Based VLSI Architecture for Image Compression", Application No. 09/885–415, Filed Jun. 30, 1997, Attorney Docket No. 042390.P4425, 37 Pgs.

Acharya, et al., "A New Scaling Algorithm and Architecture for Integer Scaling in Video", Application No. 09/008,131, Filed Jan. 16, 1998, Attorney Docket No. 042390.P4713, 38 Pgs.

Acharya, "An Integrated Color Interpolation and Color Space Conversion Algorithm From 8–Bit Bayer Pattern RGB Color Space to 12–Bit YCrCb Color Space", Application No. 09/034,625, Filed Mar. 4, 1998, Attorney Docket No. 042390.P4818, Pgs. 1–42.

Acharya, "A Median Computation–Based Integrated Color Interpolation and Color Space Conversion Methodology from 8–Bit Bayer Pattern RGB Color Space to 12–Bit YCrCb Color Space".

Application No. 09/040,806, filed Mar. 18, 1998, Attorney Docket No. 042390.P5657, 42 Pgs.

Acharya, "An Integrated Color Interpolation and Color Space Conversion Algorithm from 8–Bit Bayer Pattern RGB Color Space to 24–Bit CIE XYZ Color Space", Application No. 09/048,901, Filed Mar. 26, 1998, Attorney Docket No. 042390.P5644, 43 Pgs.

Acharya, "A Median Computation–Base Integrated Color Interpolation and Color Space Conversion Methodology from –Bit Bayer Pattern RGB Color Space to 24–Bit CIE YXZ Color Space", Application No. 09/050,743, Filed Mar. 30, 1998, Attorney Docket No. 042390.P5045, 36 Pgs.

Edward J. Bawolek et al., "Infared Correction System", Application No. 09/126,203, Filed: Jul. 30, 1998, Attorney Docket No. 042390.P6172, 18 Pgs.

Acharya, "An Efficient Methodology to Select the Quantization Threshold Parameters in a DWT–Based Image Compression Scheme in Order to Store a Predefined Minimum Number of Images into a Fixed Size Secondary Storage".

Application No. 09/146,159, Filed Sep. 3, 1998, Attorney Docket No. 042390.P6081, 35 Pgs.

Pazmino, et al., "Method of Compressing And/Or Decompressing a Data Set Using Significance Mapping", Application No. 09/151,336, Filed: Sep. 11, 1998, Attorney Docket No. 042390.P6391, 25 Pgs.

Tan, et al., "Reduction of Ringing Artifacts After Decompression of a DWT–Based Compressed Image", Application No. 09/165,511, Filed: Oct. 2, 1998, Attorney Docket No. 042390.P6220, 20 Pgs.

Tan, et al., "Robust Sequential Approach in Detecting Defective Pixels Within an Image Sensor", Application No. 09/191,310, Filed: Nov. 13, 1998, Attorney Docket No. 042390.P6575, 35 Pgs.

Acharya, et al., "Color Interpolation for a Four Color Mosaic Pattern", Application No. 09/199,836, Filed: Nov. 24, 1998, Attorney Docket No. 042390.P6376, 26 Pgs.

Acharya, "A Mathematical Model for Gray Scale and Contrast Enhancement of a Digital Image", Application No. 09/207,753, Filed: Dec. 8, 1998, Attorney Docket No. 042390.P6217, 28 Pgs.

Tan, et al., "Hi–Speed Deterministic Approach In Detecting Defective Pixels Within an Image Sensor", Application No. 09/258,636 Filed: Feb. 26, 1999, Attorney Docket No. 042390.P5434, 32 Pgs.

Acharya, "Enhancing Image Compression Performance by Morphological Processing", Application No. 09/291,810, Filed: Apr. 14, 1999, Attorney Docket No. 042390.P6878, 31 Pgs.

Acharya, et al., "An Edge Enhanced Image Up–Sampling Algorithm Using Discrete Wavelet Transform", Application No. 09/292,763, Filed: Apr. 14, 1999, Attorney Docket No. 042390.P6879, 32 Pgs.

Tan, et al., "Using An Electronic Camera to Build a File Containing Text", Application No. 09/301,753, Filed: Apr. 29, 1998, Attorney Docket No. 042390.P5742, 21 Pgs.

Tsai, et al., "Method and Apparatus for Adaptively Sharpening an Image", Application No. 09/320,192, Filed: May 26, 1999, Attorney Docket No. 042390.P6452, 27 Pgs.

Acharya, et al., "Image Processing Method and Apparatus", Application No. 09/359,523, Filed: Jun. 4, 1999, Attorney Docket No. 042390.P7323, 16 Pgs.

Tan, et al., "Method and Apparatus for Adaptively Sharpening Local Image Content of an Image", Application No. 09/328,935, Filed: Jun. 9, 1999, Attorney Docket No. 042390.P7125, 29 Pgs.

Tan, et al., "A Hardware Efficient Wavelet–Based Video Compression Scheme", Application No. 09/342,863, Filed: Jun. 29, 1999, Attorney Docket No. 042390.P6529, 32 Pgs.

Tan, et al., "A Methodology for Color Correction With Noise Regulation", Application No. 09/359,831, Filed: Jul. 23, 1999, Attorney Docket No. 042390.P7320, 30 Pgs.

Tan, et al., "Method and Apparatus for Automatic Focusing in an Image Capture System Using Symmetric Fir Filters", Application No. 09/383117, Filed: Aug. 25, 1999, Attorney Docket No. 042390.P6694, 28 Pgs.

Acharya, et al., "Square Root Raised Cosine Symmetric Filter for Mobile Telecommunications", Application No. 09/429,058, Filed: Sep. 2, 1999, Attorney Docket No. 042390.P7629, 26 Pgs.

Acharya, "Discrete Filter", Application No. 09/432,337, Filed: Sep. 2, 1999, Attorney Docket No. 042390.P7626, 12 Pgs.

Acharya, et al., "Zerotree Encoding of Wavelet Data", Application No. 09/390,255, Filed: Sep. 3, 1999, Attorney Docket No. 042390.P7057, 29 Pgs.

Acharya, et al., "A Fuzzy Distinction Based Thresholding Technique for Image Segmentation", Application No. 09/393,017 Filed: Sep. 10, 1999, Attorney Docket No. 042390.P7115, 29 Pgs.

Acharya, et al., "A Fuzzy Based Thresholding Technique for Image Segmentation", Application No. 09/393,136, Filed: Sep. 10, 1999, Attorney Docket No. 042390.P7114, 28 Pgs.

Acharya, et al., "Video Motion Estimation", Application No. 09/406,032, Filed: Sep. 27, 1999, Attorney Docket No. 042390.P7330, 24 Pgs.

Acharya, et al., "Method of Interpolating Color Pixel Signals From a Subsampled Color Image", Application No. 09/410,800, Filed: Oct. 1, 1999, Attorney Docket No. 042390.P7331, 20 Pgs.

Acharya, et al., "Method of Compressing a Color Image", Application No. 09/411,697, Filed: Oct. 1, 1999, Attorney Docket No. 042390.P7463, 26 Pgs.

Acharya, et al., "Indexing Wavelet Compressed Video for Efficient Data Handling", Application No. 09/438,091, Filed: Nov. 10, 1999, Attorney Docket No. 042390.P6454, 29 Pgs.

Metz, et al., "Image Processing Architecture", Application No. 09/473,643, Filed: Nov. 18, 1999, Attorney Docket No. 042390.P8050, 12 Pgs.

Miao, et al., "Dual Mode Filter for Mobile Telecommunication", Application No. 09/467,611, Filed: Nov. 18, 1999, Attorney Docket No. 042390.P8027, 31 Pgs.

Acharya, "Method of Converting A Sub–Sampled Color Image", Application No. 09/461,068, Filed: Dec. 14, 1999, Attorney Docket No. 042390.P4790, 23 Pgs.

Acharya, "Method of Upscaling a Color Image", Application No. 09/461,080, Filed: Dec. 14, 1999, Attorney Docket No. 042390.P7489, 22 Pgs.

Acharya, et al., "Chip Rate Selectable Square Root Raised Cosine Filter For Mobile Telecommunications", Application No. 09/467,487, Filed: Dec. 20, 1999, Attorney Docket No. 042390.P8026, 33 Pgs.

Acharya, et al., "An Efficient Companding Algorithm Suitable For Color Imaging", Application No. 09/482,551, Attorney Docket No. 042390.P4961D, 44 Pgs.

Acharay, "A Block–Matching Algorithm For Color Interpolation", Application No. 09/494,087, Filed: Jan. 28, 1999, Attorney Docket No. 042390.P5090D, 45 Pgs.

Acharya, et al., "Method of Inverse Quantizing Quantized Signal Samples of an Image During Image Decompression", Application No. 09/507,213, Filed: Feb. 18, 2000, Attorney Docket No. 042390.P8350, 32 Pgs.

Acharya, et al., "Method of Quantizing Signal Samples of an Image During Image Compression", Application No. 09/507,399, Filed: Feb. 18, 2000, Attorney Docket No. 042390.P7135, 24 Pgs.

Acharya, et al., "Method of Integrating a Watermark Into a Compressed Image", Application No. 09/519,135, Filed: Mar. 6, 2000, Attorney Docket No. 042390.P7319, 25 Pgs.

Acharya, et al., "Mehtod Of Integrating a Watermark Into an Image", Application No. 09/519,874, Filed: Mar. 6, 2000, Attorney Docket No. 042390.P7136, 27 Pgs.

Acharya, et al., "Method of Using Hue to Interpolate Color Pixel Signals", Application No. 09/591,867, Filed: Jun. 12, 2000, Attorney Docket No. 042390.P8746, 23 Pgs.

Dunton, et al., "Dual Mode Digital Camera for Video and Still Operation", Application No. 09/595,055, Filed: Jun. 16, 2000, Attorney Docket No. 042390.P5079C, 27 Pgs.

Kim, et al., "Method of Performing Motion Estimation", Application No. 09/596,127, Filed: Jun. 16, 2000, Attorney Docket No. 042390.P8747, 29 Pgs.

Acharya, et al., "Method of Compressing an Image", Application No. 09/597,354, Filed: Jun. 19, 2000, Attorney Docket No. 042390.P8760, 23 Pgs.

* cited by examiner

METHOD OF COMPRESSING AN IMAGE

BACKGROUND

The present disclosure is related to compressing images.

As is well-known, image compression techniques are desirable for a variety of purposes. For example, without limitation, images are compressed for storage and/or for transmission across a communications medium. Desirable aspects of image compression techniques include: occupying less storage space; applicability to a wide variety of images; and/or computationally efficient or fast encoding/decoding. Improvements in image compression that include one or all of these aspects continue to be desirable.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

As previously discussed, image compression is desirable for a number of applications. Furthermore, it is desirable if such compression techniques occupy less storage space, are applicable to a wide variety of images, and/or have an encoding/decoding process that is computationally efficient or fast.

One technique that is sometimes employed in compression, such as in connection with the wavelet transform, or fractal-based compression/decompression, as two examples, involves a multi-resolution decomposition or multi-level division of the image. An embodiment of the present invention, based at least in part on fractal image compression, using an Iterative Function System (IFS), guided by certain probability measures, shall be described in more detail hereinafter. A basic notion of fractal image compression lies in the usage of self-similarity embedded in a given image. Using a set of affine contractive maps, as shall be explained in more detail hereinafter, for example, portions of an image may be reproduced, and by taking a collage of these parts, the entire image may be regenerated. The set of affine contractive maps is referred to in this context as IFS. For a particular embodiment in accordance with the invention, although the invention is not limited in scope in this respect, probabilities are assigned to the maps, which in turn, affect the iteration process, and generate, in this embodiment, a close approximation of the image, employing a manageable amount of computational complexity or computational burden. A way to conceptualize the multi-level division of the image, then, for this particular embodiment, is as a "divide-and-conquer" approach. Therefore, an image may be subdivided and then the subdivisions may be further subdivided in a recursive fashion to determine how to compress the image efficiently.

Figure 1:
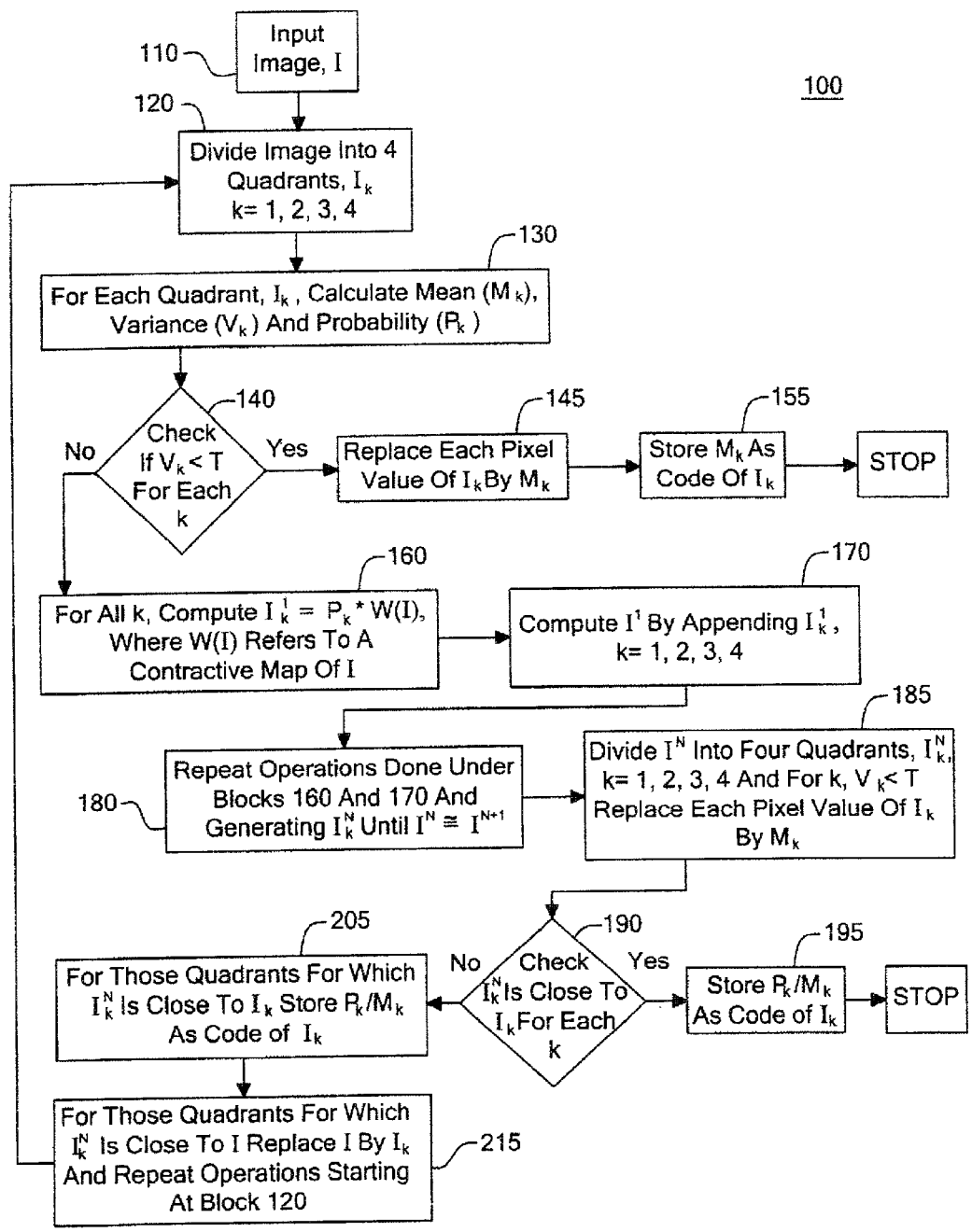
FIG. 1 is a flowchart illustrating an embodiment of a method of compressing an image in accordance with the present invention.

An embodiment of compressing an image in accordance with the present invention is one such approach. FIG. 1 is a flowchart illustrating this particular embodiment. It is noted that the invention is not limited in scope to this particular embodiment and many variations are possible within the scope of the present invention.

In this particular embodiment, the image, in this embodiment, a gray scale image, I, is divided into quadrants, here designated $I_K$, where K is 1, 2, 3, and 4. As shall be described in more detail below, the mean $(m_K)$, variance $(v_K)$, and probability $(p_K)$, for each quadrant is calculated, although the invention is not limited in scope in this respect. Other measures, other than the mean $(m_K)$, variance $(v_K)$, and probability $(p_K)$, may alternatively be employed, as described in more detail hereinafter. The variation in gray scale values for the pixels in each quadrant is measured so that each quadrant is classified as a low variation quadrant or a high variation quadrant in terms of its gray scale levels. A low variation quadrant indicates that the image in that particular quadrant is relatively smooth. Therefore, in this particular embodiment, for a low variation quadrant, the gray scale value at each pixel location is replaced with a single gray scale value estimate for the particular quadrant. Of course, in alternative embodiments, multiple estimates of gray scale values may be employed, instead. For the quadrants of the image that are high variation quadrants, these may be estimated using what is referred to in this context as a contractive map of the image along with the probability $(p_K)$, as shall be discussed in more detail. However, if the high variation quadrant may not be accurately estimated using a contractive map of the image, then that particular high variation quadrant is further subdivided and the previous approach is then applied to the subdivisions.

Although the invention is not limited in scope to a particular approach to measuring the gray scale variation of a quadrant of an image, in this particular embodiment, the gray scale variation is measured using the statistical variance, $v_K$, of the gray scale values of a particular quadrant, as indicated above. Then, whether a quadrant qualifies as a low variation quadrant or a high variation quadrant, in this particular embodiment, depends upon the variance of the quadrant measured against a pre-determined threshold value. It is noted that many different approaches to determine a threshold level are possible and the invention is not limited in scope to a particular approach. Likewise, in alternative embodiments, it may be desirable to adjust the threshold depending, at least in part, upon the size of the image or image blocks, or, depending, at least in part, upon the exposure of the particular image, although the invention is also not limited in scope in these respects, as well.

In one embodiment, a high variation quadrant is where the statistical variance is above or equal to the pre-determined threshold, and a low variation quadrant is otherwise. In another embodiment, a low variation quadrant is where the statistical variance is below or equal to the predetermined threshold, and a high variation quadrant is otherwise.

Likewise, when replacing a low variation quadrant with an estimate of the gray scale level for the particular quadrant, many approaches are possible and the invention is not limited in scope to a single approach. Nonetheless, in this particular embodiment, the statistical mean ($m_K$) of the gray scale values in the particular quadrant are employed, as previously described. Therefore, if a quadrant is a low variation quadrant, each pixel location gray scale value in that quadrant is replaced by the statistically computed mean gray scale value for the quadrant, again, in this particular embodiment.

As indicated above, an attempt is made to estimate particular quadrants using a contractive map of the image along with the probability ($p_K$). In this particular embodiment, the contractive map is formed by considering non-overlapping windows of size two-by-two contiguous pixels over the entire image and summing the four pixels within the window for the particular pixel location. In this context, this is referred to as a spatial summing filter, here, a two-by-two summing filter. Thus, in this particular embodiment, the size of the contractive map of the image becomes the same as the size of a quadrant of the image.

It is noted, of course, that alternative approaches to forming a contractive map may be employed. For example, a window of size three-by-three or perhaps a window of a shape other than a square shape may be employed. Nonetheless, in addition to forming a contractive map, for the particular quadrant, the probability is calculated for the quadrant. In this embodiment, for a quadrant, the probability of the quadrant is the ratio of the sum of the pixel gray scale values over the quadrant to the sum of the pixel gray scale values over the image. This may be illustrated by the following equation.

$$p_K = S_K/S, \quad [1]$$

where $S_K$ is the sum of gray scale values for the pixel locations in quadrant $I_K$ of image I, where K=1 to 4, and S is the sum of gray scale values for the pixel locations in I; and $$\Sigma p_K = 1, \quad [2]$$

where K=1 to 4.

A particular quadrant is then estimated by multiplying the probability of that quadrant times the contractive map of the image, the multiplication being a scalar multiplication of the contractive map.

Once this is complete for the quadrants of an image, an estimate, $I^1$, of the image, I, may be formed by combining the estimates for the quadrants. Another image is estimate, $I^2$, is formed by iteratively applying the previous approach, quadrants are estimated using the mean gray scale value and high variation quadrants are estimated using a contractive map of the estimate image, $I^1$, scaled by the probability of the particular quadrant. If this estimate image $I^2$, is equal to the image it was estimated from, $I^1$, then this recursive estimation process is terminated, and the resulting estimate image, $I^1$, is divided into quadrants that are compared with corresponding quadrants of the original image. Alternatively, if the estimates are not equal, then the new estimate, $I^2$, is treated as the image to be estimated and the previously described approach is recursively repeated until the estimate image, $I^{N+1}$, equals the image from which it is estimated, $I^N$, after N such iterations.

Once an estimate, $I^{N+1}$, equals the image from which it is estimated, $I^N$, for each quadrant of the estimate image, $I^N$, low variation quadrants are estimated using mean gray scale values. If the particular quadrant is then "close" to the corresponding quadrant of the original image, I, those quadrants are stored as either the mean gray scale value of the original image, if it was a low variation quadrant, or the probability value for the original image, if it was a high variation quadrant. If all quadrants of the estimate image are close to the original image, compression is complete. However, if some quadrants of the estimate are not close, then those or that quadrant may not be estimated using a mean gray scale value or a contractive map of the image along with the probability ($p_K$) at this particular stage. Therefore, the previous approach, beginning with subdivision into quadrants, is now applied to that or those quadrants of the original image, and that or those quadrants of the original image are treated as described above. In other words, the quadrant or quadrants are treated as the original image in the previous description, divided into four quadrants, and so forth.

Referring now to FIG. 1 and flowchart 100, at block 110, the image is received or input. It is noted that while the input image comprises an image of gray scale levels, this image may comprise a component of a color image, particularly the intensity component. At block 120, of FIG. 1, the image is divided into four equal quadrants, designated here as $I_K$, where K varies from one to four, in this particular embodiment. At block 130, as previously described, for each quadrant $I_K$, calculate the mean, $m_K$, the variance, $v_K$, and the probability, $p_K$, for each quadrant. These may be computed in the manner previously described. At block 140, compare the variance of each quadrant against a threshold value. If all quadrants have a variance are below the threshold value, at blocks 145 and 155, the image compression is complete by storing the mean gray scale for each respective quadrant. However, alternatively, at block 160, instead, the quadrants are estimated using a contractive map, as previously described.

Blocks 170 and 180 refer to an approach where the estimate of the image is formed from the estimate of the quadrants, the previous calculations are repeated and so forth, until two successive image estimates are equal. Once two successive image estimates are equal, low variation quadrants are estimated using mean gray scale values at block 185. At block 190, the quadrants of the estimate are compared with the quadrants of the original image. At 195, if all of the estimated quadrants are close to the original quadrants, then the entire image is estimated using mean gray scale values and/or probability values, depending on whether a particular quadrant is a low variation quadrant or a high variation quadrant. It is noted, in this context, that any one of a number of different measures may be employed to determine whether the estimate of the quadrant and the corresponding quadrant of the original estimate are "close," such as mean squared error (MSE) and other approaches. If on the other hand, not all the quadrant estimates are close to the corresponding original image quadrants, then for those quadrants that are close, the estimate of the quadrant is employed, whether the mean or the probability for the particular quadrant and, for those quadrants that are not close, the particular quadrant is treated as an image and is subdivided, at block 120, and so forth. It is noted in this context that for this particular embodiment a quadrant which is estimated and not close to the original image would probably be a high variation quadrant, due to the presence of block 185.

Figure 2:
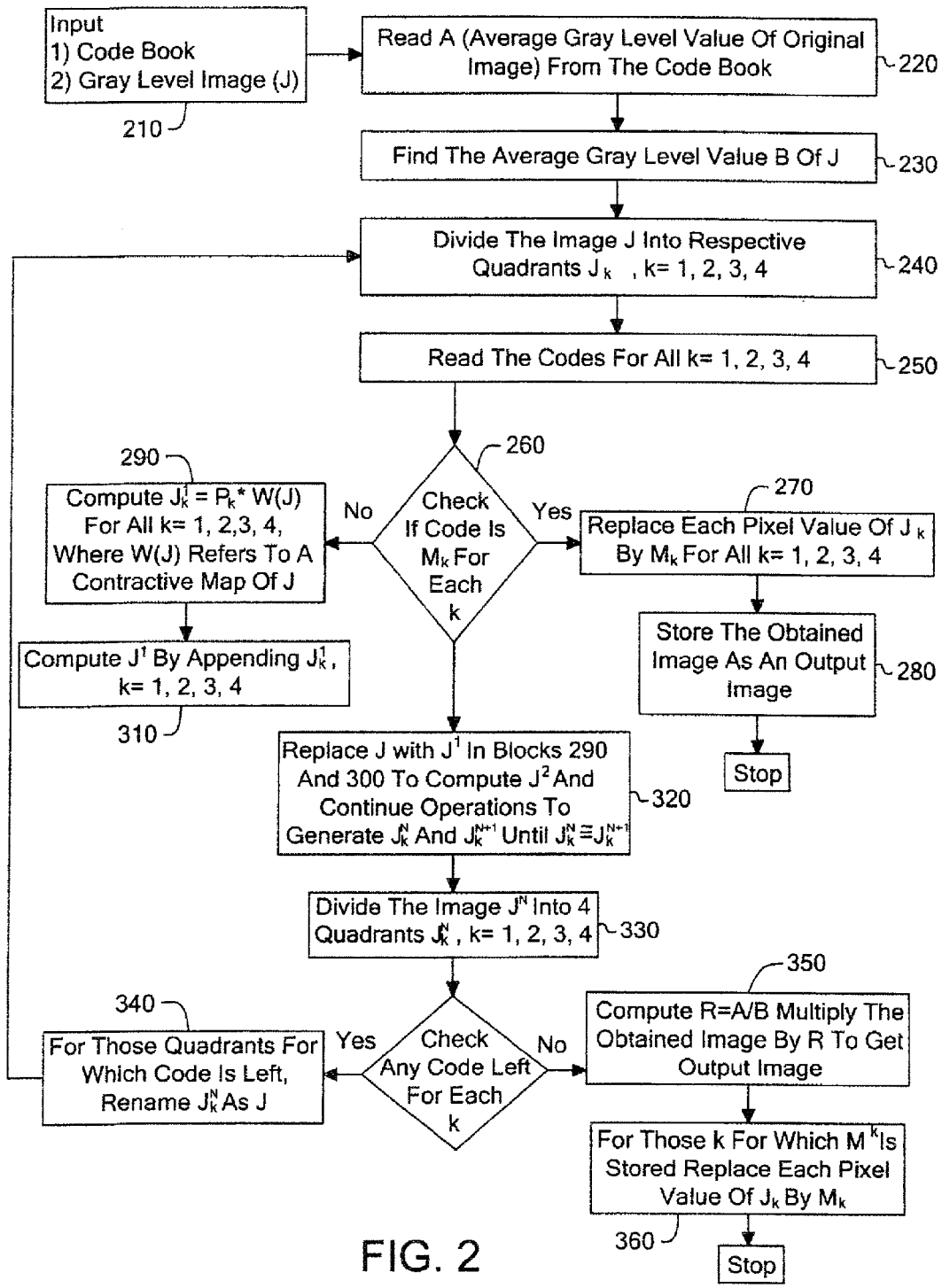
FIG. 2 is a flowchart illustrating an embodiment of a method of decompressing an image that corresponds to the embodiment of FIG. 1.

FIG. 2 is a flowchart illustrating an embodiment 200 of a method of decompressing an image, this embodiment corresponding to the embodiment of FIG. 1. Of course, the decompression process or method will, in general, correspond with the particular compression process or method, and, therefore, the invention is not restricted in scope to the decompression embodiment illustrated.

This embodiment begins with an arbitrary image, J, having the same dimensions as the image to be decompressed, this arbitrary image having at least one zero pixel gray scale value. Therefore, at block 210, this image is read or input and the "codebook" of the compressed image is read or input. At block 220, the mean or average value for the compressed image is read from the codebook. At 230, the average value of the arbitrary image is computed. At 240, the arbitrary image is divided into quadrants. At 250, 260, 270, and 280, if the code for each quadrant from the codebook is a mean value, $m_K$, then the image is decompressed using these values as indicated in block 270, and decompression is complete.

Otherwise, at blocks 290, 310, and 320, the probabilities from the codebook are employed with a contractive map of the arbitrary image to form a decompression estimate, $J^1$. This is then repeated using the next level of the codebook to form decompression estimate, $J^2$. If these estimates are not equal, this is continued using the codebook until two successive estimates, $J^N$, and $J^{N+1}$, are equal, at block 320.

If two successive estimates are equal, then, at block 330, the estimate, $J^N$, is divided into quadrants. If probabilities remain in the codebook, then, at block 340, the corresponding quadrant of $J^N$ is treated as the arbitrary image, J, and the process is recursively applied to this image at block 240. Eventually, once no more codes remain for the probability, at block 350, the resulting image is scaled, and, at block 360, the quadrants in which the mean gray scale level has been stored are reconstructed.

It will, of course, be understood that, although particular embodiments have just been described, the invention is not limited in scope to a particular embodiment or implementation. For example, one embodiment may be in hardware, whereas another embodiment may be in software. Likewise, an embodiment may be in firmware, or any combination of hardware, software, or firmware, for example. Likewise, although the invention is not limited in scope in this respect, one embodiment may comprise an article, such as a storage medium. Such a storage medium, such as, for example, a CD-ROM, or a disk, may have stored thereon instructions, which when executed by a system, such as a host computer or computing system or platform, or an imaging system, may result in a method of compressing or decompressing an image, such as an image of gray scale values, in accordance with the invention, such as, for example, one of the embodiments previously described.

While certain features of the invention have been illustrated and described herein, many modifications, substitutions, changes and equivalents will now occur to those skilled in the art. It is, therefore, to be understood that the appended claims are intended to cover all such modifications and changes as fall within the true spirit of the invention.

What is claimed is:

1. A method of compressing an image, the image being having gray scale values, comprising:
   (a) dividing the image into quadrants;
   (b) measuring the gray scale variation in each quadrant so that each quadrant is either a low variation quadrant or a high variation quadrant;
   (c) replacing any low variation quadrants with an estimate for the particular quadrant;
   (d) determining whether any high variation quadrants can be estimated using a contractive map of the image; and if not, applying (a), (b), (c), and (d) to the particular one or more high variation quadrants that cannot be estimated by a contractive map of the image.

2. The method of claim 1, wherein the gray scale values comprise the intensity image component of a color image.

3. The method of claim 1, wherein the gray scale variation in each quadrant is measured using the statistical variance of the gray scale values in the particular quadrant.

4. The method of claim 3, wherein a low variation quadrant has a statistical variance below a predetermined threshold value and a high variation quadrant has a statistical variance above or equal to the predetermined threshold.

5. The method of claim 3, wherein a low variation quadrant has a statistical variance below or equal to a predetermined threshold value and a high variation quadrant has a statistical variance above the predetermined threshold.

6. The method or claim 1, wherein the estimate of the particular low variation quadrant comprises the statistical mean of the gray scale values in the particular quadrant.

7. The method of claim 1, wherein the contractive map comprises applying a two-by-two spatial summing filter.

8. The method of claim 7, wherein the high variation quadrant is estimated using a scalar multiple of the contractive map of the image.

9. An article comprising a storage medium having stored thereon instructions, that, when executed by a computing platform, results in compression of an image having gray scale values by:
   (a) dividing the image into quadrants;
   (b) measuring the gray scale variation in each quadrant so that each quadrant is either a low variation quadrant or a high variation quadrant;
   (c) replacing any low variation quadrants with an estimate for the particular quadrant;
   (d) determining whether any high variation quadrants can be estimated using a contractive map of the image; and if not, applying (a), (b), (c), and (d) to the particular one or more high variation quadrants that cannot be estimated by a contractive map of the image.

10. The article of claim 9, wherein the image having the gray scale values comprises an intensity image component of a color image.

11. The article of claim 9, wherein the gray scale variation in each quadrant is measured using the statistical variance of the gray scale values in the particular quadrant.

12. The article of claim 9, wherein the estimate of the particular low variation quadrant comprises the statistical mean of the gray scale values in the particular quadrant.

13. The article of claim 9, wherein the contractive map comprises applying a two-by-two spatial summing filter.

14. The article of claim 13, wherein the high variation quadrant is estimated using a scalar multiple of the contractive map of the image.

15. A method of decompressing a codebook for a compressed gray scale image comprising:
   (a) forming a decompression estimate image from scalar multiples of a contractive map of a previous decompression estimate image, the scalar multiples, being provided by the codebook;
   (b) if the decompression estimate image and the previous decompression estimate image are equal, then dividing the decompression estimate into quadrants and applying (a), (b), and (c) by treating the quadrants as the previous decompression estimate image until the codebook is empty of scalar multiples to apply;
   (c) if the decompression estimate image and the previous decompression estimate image are not equal, apply (a), (b), and (c) by treating the decompression estimate image as the previous decompression estimate image.

16. The method of claim 15, wherein the codebook includes at least one mean gray scale value, and further comprising:

after the codebook is empty of scalar multiples to apply to contractive maps:
scaling the result image based, at least in part, in a mean gray scale value for the compressed gray scale image, and
reconstructing those quadrants for which a mean gray scale level has been stored.

17. The method of claim 16, wherein a previous decompression estimate image comprises an arbitrary image having dimensions of the image being decompressed and having at least one non-zero pixel value.

18. The method of claim 16, wherein the contractive map comprises applying a two-by-two spatial summing filter.

19. An article comprising: a storage medium having stored thereon instructions, that, when executed by a computing platform, results in decompression of codebook for a compressed gray scale image by:

(a) forming a decompression estimate image from scalar multiples of a contractive map of a previous decompression estimate image, the scalar multiples being provided by the codebook;

(b) if the decompression estimate image and the previous decompression estimate image are equal, then dividing the decompression estimate into quadrants and applying (a), (b), and (c) by treating the quadrants as the previous decompression estimate image until the codebook is empty of scalar multiples to apply;

(c) if the decompression estimate image and the previous decompression estimate image are not equal, apply (a), (b), and (c) by treating the decompression estimate image as the previous noncompression estimate image.

20. The article of claim 19, wherein the codebook includes at least one mean gray scale value, and wherein the instructions, when executed, further result in:

after the codebook is empty, of scalar multiples to apply to contractive maps:
scaling the result image based, at least in part, in a mean gray scale value for the compressed gray scale image, and reconstructing those quadrants for which a mean gray scale level has been stored.

21. The article of claim 19, wherein a previous decompression estimate image comprises an arbitrary image having dimensions of the image being decompressed and having at least one non-zero pixel value.

22. The article of claim 19, wherein the instructions, when executed, further result in the contractive map comprising applying a two-by-two spatial summing filter.

* * * * *

UNITED STATES PATENT AND TRADEMARK OFFICE
CERTIFICATE OF CORRECTION

PATENT NO. : 6,735,520 B1
DATED : May 18, 2004
INVENTOR(S) : Acharya et al.

It is certified that error appears in the above-identified patent and that said Letters Patent is hereby corrected as shown below:

Column 3,
Line 48, delete "is".

Signed and Sealed this

Third Day of August, 2004

JON W. DUDAS
*Acting Director of the United States Patent and Trademark Office*